June 28, 1966     P. P. AMBROSE     3,257,862
WHEEL LOCKING DEVICE
Filed July 2, 1963
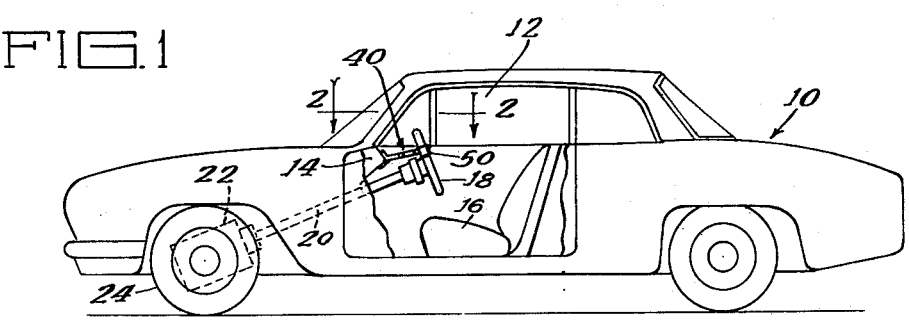
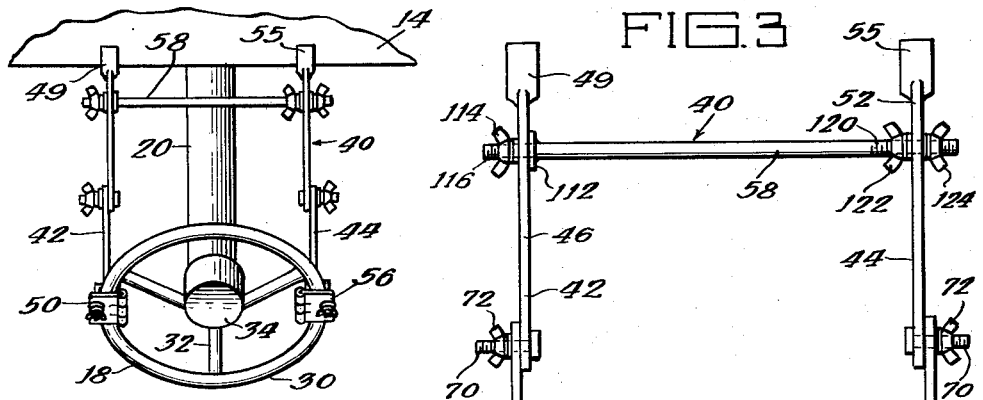
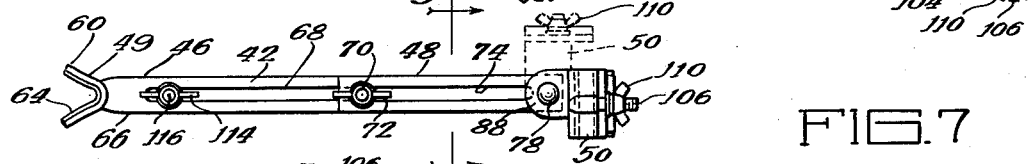
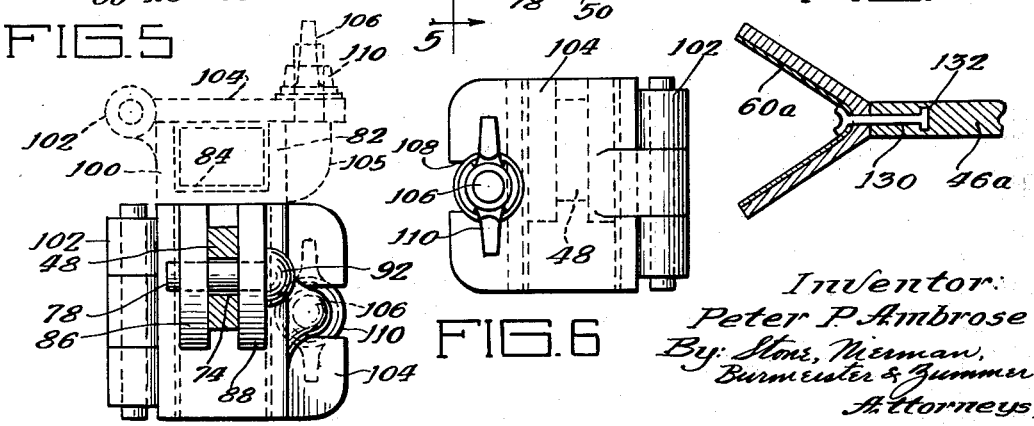
Inventor:
Peter P. Ambrose
By: Stone, Nieman,
Burmeister & Zummer
Attorneys

United States Patent Office 3,257,862
Patented June 28, 1966

3,257,862
WHEEL LOCKING DEVICE
Peter P. Ambrose, 8416 Manistee Ave., Chicago, Ill.
Filed July 2, 1963, Ser. No. 292,236
4 Claims. (Cl. 74—495)

The present invention relates to wheel locking devices and more particularly to devices for locking the front wheels of a motor vehicle in a position having a fixed angular relationship with the longitudinal axis of the vehicle, and in which position, the wheels of the vehicle are free to rotate with the motion of the vehicle.

The invention has particular utility for vehicles such as trucks, automobiles, tractors or the like which are to be towed. It is quite well known that one towing practice, necessary with certain defects in the vehicle being towed, is to raise the rear end of the vehicle on a tow lift and to allow the front wheels of the vehicle to rotate as the tow progresses. In this condition, the front wheels of the vehicle are free to change their angular relationship with the vehicle longitudinal axis while retaining their rolling condition parallel to the line of travel of the vehicle. If the wheels are originally cocked with respect to the longitudinal axis of the vehicle, the vehicle itself will assume a position with its axis oblique to the line of travel of the vehicle. In this condition, the tow is hard to control safely as the vehicle may shift positions or veer. Even when the wheels are set in any one position with respect to the vehicle axis, turning a corner or hitting a bump may jar the steering system of the vehicle and pivot the wheels with respect to the vehicle longitudinal axis. The wheels maintain their position parallel to the direction of travel of the vehicle and the vehicle itself must shift to accommodate this changed position of the vehicle. The shifting of the vehicle position is a dangerous occurrence and may lead to the side swiping of passing autos or to other similar accidents.

In the past, devices for maintaining the wheel position have taken the form of clamps or locks applied to the front wheels of a vehicle to secure the wheels to the frame of the vehicle mainly for the purpose of theft prevention. A number of problems are presented by such devices in that autos, trucks, and tractors, to name a few of the vehicles on which the device may be used, vary greatly in their relative dimensions and positioning of their parts. To be universal in application, the lock or clamp must inherently allow for this difference in dimension and positioning. Further, such locks must be applied from beneath the vehicle requiring that the user climb beneath the vehicle to install and remove the clamp. In addition, such clamps are applied in the steering system outwardly of the steering gear mechanism and the mechanical advantage inherent therein; thus any force applied to the wheels by the vehicle motion must be countered by an equal and opposite countering force.

It is, therefore, an object of the invention to provide an improved device for locking the position of the front wheels of a motor vehicle in a set position with respect to the vehicle longitudinal axis, wherein the device may be applied to all vehicles regardless of the location of the wheels with respect to the vehicle frame.

It is another object of the invention to provide a novel and improved clamping device for use on the steering system of a motor vehicle which locks the wheels from movement out of a fixed angular relationship with the vehicle longitudinal axis.

It is a further object of the invention to provide a novel device for locking the wheels of an auto or truck from movement out of a fixed angular relationship with the auto axis, wherein the device may be applied within the drive compartment of the auto.

It is a still further object of the invention to provide an improved device for maintaining the wheels of a motor vehicle in a preset angular position with respect to the vehicle longitudinal axis in which the device utilizes the mechanical advantage inherent in the vehicle steering system to counter tendencies of the wheels to leave the set position.

It is a further object of the invention to provide an improved front wheel locking device which allows the wheels to rotate about their respective axis but which inhibits all pivotal motion of the wheels with respect to the longitudinal axis of the vehicle, wherein the device is applied to the steering wheel of the vehicle and locks the steering wheel from rotational motion.

These and other objects, features and advantages of the invention will become apparent from the detailed description of a presently preferred embodiment of the invention read in connection with the accompanying drawings in which:

FIGURE 1 is a side elevational view of an automobile with the door thereof removed to show interior detail, partially diagrammatically, and the present invention applied to the automobile;

FIGURE 2 is a fragmentary plan view of the interior of the automobile of FIGURE 1 viewed along the line 2—2 of FIGURE 1;

FIGURE 3 is an elevational view of the clamping device of the present invention taken on the same plane of FIGURE 2;

FIGURE 4 is an elevational view of the clamping device as viewed from the left side as it appears in FIGURE 2, and further shows the rim clamp in a second pivoted position, this latter showing being in dashed line form;

FIGURE 5 is a sectional view taken along line 5—5 of FIGURE 4, the dashed line portions of FIGURE 4 being illustrated in dashed lines;

FIGURE 6 is an end view of the rim clamp of FIGURE 5, the clamp being shown in the pivoted position of FIGURE 5 in dashed line form;

FIGURE 7 is a second type of V shaped head for use in the present invention.

Viewing the figures in detail, FIGURE 1 shows a side view of a typical automobile 10 in which there is a driving compartment 12, the front of which is defined by a dashboard 14. To the rear of the dashboard is a conventional front seat 16 with a steering wheel 18 spaced an accessible distance from the seat 16. This steering wheel is connected to axial column 20 which extends through the vehicle firewall, below the dashboard 14, to a connection to steering gear mechanism 22 controlling the movement of front wheels 24. As in conventional, both front wheels 24 are simultaneously rotated about their individual axis in planes generally parallel to the path of travel of the automobile by the automobile drive system (not shown) or by the motion of the automobile when being moved or towed. These wheels are shifted with respect to the longitudinal axis of the automobile by the steering mechanism 22 to change the direction of travel of the automobile in the generally known manner. The steering mechanism 22 is used in automobiles for the purpose of converting the rotational movement of the steering wheel 18 into an angular deflection of the axles of the wheels and for providing a mechanical advantage between the steering wheel and the axles of the front wheels 24.

The steering wheel 18 is in the form of an annular rim 30 from which a plurality of spokes 32 project inwardly to a connection through a central hub 34. A shaft (not shown) extends from this hub interiorly of outer steering column 20 to a connection to the steering gear mechanism 22. The automobile construction described in conventionally in use in most automobiles, trucks, tractors and the like. In FIGURE 1, the invention has been shown applied to an automobile.

The clamping device 40 of the present invention is shown in FIGURES 1 and 2 applied to the steering wheel 18 of automobile 10, and comprises two parallel beams or members, member 42 shown on the left in FIGURE 2, and member 44 shown on the right in FIGURE 2. Member 42 includes a recumbent Y arm 46, an intermediate arm 48 slideably connected to arm 46 near the arm end remote from the Y head 49, and a wheel rim clamp 50 pivotally secured to the end of intermediate arm 48 remote from its slideable connection.

Beam or member 44 is similar in shape and size to member 42, and is in fact a mirror image of the member 42. Thus, member 44 has a recumbent Y arm 52, an intermediate arm 54 slideably connected to arm 52 near the end remote from the head 55 of the arm, and a wheel rim clamp 56 pivotally secured to the end of arm 54 remote from its slide connection to the Y arm 52.

The left beam 42 of device 40 is shown in detail in FIGURE 4, and will be explained in connection therewith. It will be understood that the elements as described pertain equally to the construction of right beam 44, which includes like elements with the exception of the left and right positioning of the components of the elements. In all other details the two members are alike and will be described as such. Member 42 includes the recumbent Y arm 46 with its open V head 49 at one end of the arm. Within the opening made by the arms 60 of head 49 there is adhered a layer 64 of suitable lining material to prevent the head 49 from scraping and scarring the dashboard of an automobile against which it is braced. The head 49 at its apex is permanently secured as by welding to a horizontal rib section 66 of arm 46. This rib section is long and comparatively shallow and is slotted, as indicated by the reference character 68. Slot 68 extends horizontally for a distance of about six or eight inches in length, is about three fourths of an inch high, extends through the rib section completely and terminates a short distance from the end of the rib section opposed to the V head 49. Within slot 68, there is fitted a bolt 70 with a wing nut 72 mounted thereon. This bolt also extends through an alignable slot 74 in intermediate arm 48 to form the slideable connection between arms 46 and 48 previously referred to. Slot 74 may be about six inches in length to provide a great amount of relative slide movement between the arms 46 and 48. With nut 72 tightened on bolt 70, this slide movement is terminated and the arm length is thereby set and locked. At the end of slot 74 remote from the connection to arm 46, the slot terminates adjacent a centrally positioned circular hole 76 through the arm 48 for connection to the wheel clamp 50.

Wheel rim clamp 50, as can be seen in FIGURE 5, has a main U shaped section 82 from the base 84 of which there project two spaced apart legs 86 and 88 which straddle the end of arm 48. These legs have aligned holes which in turn are aligned with hole 76 in arm 48 for receiving a pivot pin 78. The pin 78 has a head 92 outside one leg 88 and is peened over outside the other leg 86 to permanently hold the arm 48 between the legs. The legs 86 and 88 are firmly secured to the base 84, as by welding to complete rigid structure. At the free end of one of the legs 100 of the U section 82 there is pivotally mounted at hinge 102 a closure plate 104. Hinge 102 is firmly secured to the leg 100 at its free end in a permanent manner. The closure plate 104 may pivot about the hinge 102 to open or close the opening of the U section 82. At the free end of the other U leg 105 there is mounted an upright bolt 106 which extends through an edge groove 108 in closure plate 104. When a wing nut 110 is threaded down on bolt 106, the closure plate 104 is locked in place closing the rim clamp 50. This clamp or closing action is used to grip rim 30 of a steering wheel 18, as will be explained more fully.

Extending between slot 68 in the Y arm 46 of the left member 42 and the aligned like slot in Y arm 52 of right member 44 is the elongated rod or stud 58. Stud 58 is long enough to reach between the left and right members, is threaded at both ends and extends through the slots 68 of both members 42 and 44. Inwardly, adjacent one Y arm, for example arm 46 of member 42, the stud has a shoulder 112 which abuts against the arm adjacent the slot 68. A wing nut 114 is mounted on the threaded end 116 of stud 58 to enclose arm 46 between the shoulder 112 and nut 114. At its other end, stud 58 has a comparatively long threaded end 120 which allows movement of side member 44 relative to member 42. Opposed wing nuts 122 and 124 are mounted on the stud on either side of arm 52 of member 44 to lock the position of one member relative to the other member. Since the wing nuts 122 and 124 may be adjusted on stud 58, the device of the present invention may be adjusted for use on steering wheels with different diameters.

The members 40 and 42 lie in a common plane at an acute angle to the steering column 20 of the vehicle. As a result, a torque transmitted to the steering wheel 18 from the wheels 24 tends to compress one of the members 40 or 42 and release the other. The stud 58 prevents "walking" of the members 40 and 42 on the dashboard of the vehicle.

The length of members 42 and 44 can be adjusted individually to vary the distance between their respective wheel clamps 50 and 56 and their respective V heads 49 and 55. For example, in member 42, by loosening wing nut 72, the arms 46 and 48 may be telescoped together to vary the length of member 42. This adjustment in each member is provided to allow for the differences in the distances between the wheel and dashboard for various vehicles. As a second adjustment, the wheel diameter may be compensated for in the adjustment of stud 58 with its opposed wing nuts 122 and 124. A further allowance is made for the various angles between the steering wheel and the dashboard corner in various automobiles by the pivotal motion of the rim clamps 50 and 56 about their respective pivots at their separate pivot pins 78.

In addition, as shown in FIGURE 7, an adjustment may optionally be provided in the revised V head 60a of arm 46a; otherwise arm 46a is identical to arm 46. V head 60a is secured to the body of arm 46a through a pin 130 anchored to the arm and extending through the V center. This pin allows the head 60a to be rotated with respect to arm 46a and the remainder of the clamping device. This adjustability may prove important with some of the automobile interior dimensions in use.

To fit a clamping device 40 to an auto, many methods are possible. One expedient way would be to loosen all the wing nuts and especially wing nuts 110 holding the top closures 104 on both rim clamps 50 and 56. The rim clamps 50 and 56 may then be adjusted on opposite sides of the wheel rim 30 and the wing nuts tightened partially. Then the V heads 49 and 55 can be fitted onto the upper angled edge of the dashboard 14 and the wing nuts 72 tightened to set the distance between the V heads of each member 42 and 44 and the respective rim clamps. The wing nuts 114, 122 and 124 on stud 58 are then tightned to brace the stud 58 tightly between the left and right member.

This locking of clamping device 40 between the steering wheel 18 and the dashboard 14 locks the wheel from rotation about its axis along the steering column 20. This requires that the direction of the clamp provide a countering force acting against the tendency of the steering wheel to rotate about its axis To attain this effect, a portion of the countering tendency, the force exerted by the clamping device 40, must be in the plane of the steering wheel itself. With this requirement satisfied, the clamping device will counter tendencies of the steering wheel to move in response to action imparted to the wheel by jolts, cornering or the like.

When the clamp device 40 has been installed, the position of the steering wheel is locked relative to the automobile body and the front wheels are thereby locked in a fixed angular position relative to the automobile longitudinal axis. The wheels may rotate but may not pivot or otherwise change their position with respect to the automobile longitudinal axis The force applied at the steering wheel to control the wheels utilizes the mechanical advantages of the steering gear mechanism, and as a result a comparatively small amount of pressure is applied to the steering wheel when compared to the force applied to the front wheels to cause sidewise movement.

With the front wheels locked from sidewise or pivotal movement, the car may be towed by raising the rear end and allowing the front wheels to rotate as the tow truck progresses The automobile front wheels will rotate about their axes and the automobile will return its angular relationship with the wheels and will follow the tow truck without veering or shifting its position relative to the tow truck. At the conclusion of a towing operation, the device 40 may be loosened and removed in an obvious manner and kept pending the next use.

While there has been described what is at present thought to be a preferred embodiment of the invention, it will be understood that it is the intent to cover in the appended claims all such modifications as fall within the true spirit and scope of the invention.

The invention claimed and described is:

1. A device for use on the steering wheel of a vehicle of the type in which there is a peripheral circular rim having connection to an axial column extending toward the front wheels of the vehicle and having connection therewith in such a manner that rotation of the steering wheel causes movement of the front wheels to vary the angular relationship between the front wheels and the vehicle longitudinal axis, and wherein the steering wheel is spaced from a front wall of the driving compartment of the vehicle, the invention comprising a device for preventing said steering wheel from rotation comprising a first member adapted to be braced between one portion of the steering wheel of a vehicle and the front wall of the vehicle, a second member adapted to be braced between a second portion of the steering wheel spaced from the first portion thereof and the front wall of the vehicle, and a rigid means extending between the first member and the second member and maintaining the first member in a fixed position relative to the second member, the first and second members each including a first arm, a second arm, releasable means connecting the first arm adjacent to one end thereof to the second arm adjacent to one end thereof, a clamp pivotally mounted on the other end of the first arm and adapted to be connected to the rim of the steering wheel, and a V-shaped head extending from the other end of the second arm adapted to engage the front wall of the vehicle 2. A device for use on the steering wheel of an automobile of the type in which there is a peripheral circular rim having connection to an axial column extending toward the front wheels of the automobile and having connection therewith in such a manner that rotation of the steering wheel causes movement of the front wheels to vary the angular relationship between the front wheels and the automobile longitudinal axis, and wherein the steering wheel is spaced from an interior front wall of the driving compartment of the automobile, the invention comprising a first member adapted to be braced between one portion of the steering wheel of a vehicle and the front wall of the vehicle, a second member adapted to be braced between a second portion of the steering wheel spaced from the first portion thereof and the front wall of the vehicle, and a rigid means extending between the first member and the second member and maintaining the first member in a fixed position relative to the second member, the first and second members each including a first arm, a second arm, releasable means connecting the first arm adjacent to one end thereof to the second arm adajcent to one end thereof, said releasable means on release permitting limited sliding movement between the first arm and the second arm, a clamp pivotally mounted on the other end of the first arm and adapted to be connected to the rim of the steering wheel, and a V-shaped head extending from the other end of the second arm adapted to engage the front wall of the vehicle.

3. A device for use on the steering wheel of an automobile of the type in which there is a peripheral circular rim having connection to an axial column extending toward the front wheels of the automobile and having connection therewith in such a manner that rotation of the steering wheel causes movement of the front wheels to vary the angular relationship between the front wheels and the automobile longitudinal axis, and wherein the steering wheel is spaced from an interior front wall of the driving compartment of the automobile, the invention comprising a first member adapted to be braced between one portion of the steering wheel of a vehicle and the front wall of the vehicle, a second member adapted to be braced between a second portion of the steering wheel spaced from the first portion thereof and the front wall of the vehicle, and a rigid means extending between the first member and the second member and maintaining the first member in a fixed position relative to the second member, the first and second members each including a first arm, a second arm, releasable means connecting the first arm adjacent to one end thereof to the second arm adjacent to one end thereof, one of said arms having a slot and the other of said arms having an aperture, said releasable means including a bolt extending through the slot and aperture and a lock nut engaging said bolt, a clamp pivotally mounted on the other end of the first arm and adapted to be connected to the rim of the steering wheel, and a V-shaped head extending from the other end of the second arm adapted to engage the front wall of the vehicle.

4. A device as in claim 3 wherein the rigid means extending between the first member and the second member comprises a rod threaded at opposite ends and having an outwardly extending flange recessed inwardly from each end, one end of said rod being disposed within the slot of the arm of one member and the other end of the rod being disposed within the slot of the arm of the other member, and lock nuts threaded on the ends of the rod engaging the arms of the first and second members.

References Cited by the Examiner

UNITED STATES PATENTS

| | | | |
|---|---|---|---|
| 1,140,141 | 5/1915 | Fagan. | |
| 1,631,355 | 6/1927 | Baldwin. | |
| 1,942,701 | 1/1934 | Hilton | 24—81 |
| 2,625,837 | 1/1953 | Holmes | 74—495 |
| 3,066,368 | 12/1962 | Czaper | 74—495 X |

MILTON KAUFMAN, *Primary Examiner.*